Fig. 2

INVENTOR.
WILLIAM HERBERT KAGLEY.
BY
ATTORNEY.

Aug. 12, 1947. W. H. KAGLEY 2,425,374
CAP EMBOSSING DEVICE
Filed Nov. 13, 1944 7 Sheets-Sheet 7

INVENTOR.
WILLIAM HERBERT KAGLEY.
BY
ATTORNEY.

Patented Aug. 12, 1947

2,425,374

UNITED STATES PATENT OFFICE 2,425,374

CAP EMBOSSING DEVICE

William Herbert Kagley, Lindsay, Calif., assignor to Lindsay Ripe Olive Company, Lindsay, Calif., a corporation of California Application November 13, 1944, Serial No. 563,297

14 Claims. (Cl. 101—6)

This invention relates to canning machinery, and particularly to a cap embossing device for embossing code or other information on caps or lids of jars, bottles, or cans as they are used up by a standard capping machine. The device is to supplement a standard capping machine of the type which places caps or lids on jars, bottles, or cans, and while it is an independent unit suitable for operation in various environments it has its greatest utility in association between a standard cap feeder and a standard capping machine.

A further object of the invention is to provide a cap embossing device which is independent in that it does not use power or timing from either the cap feeder or the capping machine nor does any part of a standard cap feeder or capping machine need to be moved or changed to make way for the embossing device, except for a small hole or holes to be cut in the top plate of the magazine of the cap feeder, and a slot to be formed in the cap chute between the cap feeder and capping machine.

More specifically, it is an object of the invention to employ a conventional cap chute located between the feeder and capping machine, conditioned by the presence or absence of a predetermined supply of caps in the chute, to control delivery of caps from the feeder through the embossing device to the capping machine. This is an important advance in the art. Various prior art devices intended for marking caps use cans in a capping machine as the controls, it being necessary to employ some special design of capping machine for the purpose. This would not be satisfactory with a standard capping machine as there is too much separation between the cap feeder and the capping mechanism which performs the capping operation. In the standard cap feeder and capping machine combination caps come through the feeder at random and are picked up from the chute by jars, or bottles, or cans. The object of the embossing device is to keep the chute full of embossed caps and to avoid jamming of caps in the chute, or repeated embossing operations on a single cap. Both objects are accomplished by controlling delivery of caps from the feeder to the chute governed by the presence or absence of the predetermined supply of caps in the chute; thus if the chute is full no caps are delivered from the feeder, and the embossing wheels rotate idly without any cap upon which to operate.

Further objects of the invention are to provide an embossing device of the character described in which long wear is inherent, the changing of type on the embossing wheels requires a minimum of time, the embossing results are excellent without danger of fracture, distortion, or damage, the capping machine will not run short of caps if there are sufficient caps in the feeder, which device can be changed in the minimum of time to operate on different size caps, cannot get out of time in its mechanism from jams in the feeder or capping machine, and if torn down is very easy to time on reassembling.

These and other objects of the invention will become more apparent from a consideration of the detailed description which follows, taken in conjunction with the drawings.

The standard cap feeder 20 illustrated in the drawings includes a cap unscrambler 21 associated with a standard magazine 22, the unscrambler being provided with a hopper (not illustrated) into which caps C are poured, such caps being automatically segregated and positioned upright and fed into the magazine. From the magazine the caps slide by gravity down into a chute 23 which is normally part of the capping machine 24. At the lower end of the chute the jars or cans (not illustrated) clip off the caps, which are presented in a tilted position, and in the main part of the capping machine 24 a traveling belt presses down the caps and seals them in the presence of steam which condenses and creates a vacuum in the jars. This subject matter is indicated to show the general environment in which my embossing device 25 can be installed. No modification of the capping machine is necessary, except to provide a slot in the chute for operation of the die wheels. The only modification of the cap feeder is the forming of some holes in the upper flange of the magazine as later described. My embossing device is associated mainly in the region of the standard chute and performs its function of embossing the caps while such caps are en route from the magazine to the capping mechanism.

If caps fill the chute below the embossing device the latter should not emboss or deliver caps but should operate idly in order that there be no congestion of caps in the chute below the embossing device. As long as caps are being used up from the chute in the capping machine the embossing device should function to keep the chute supplied with embossed caps.

I use the condition in the cap chute itself to over-control and hold back the caps so long as the chute is full. In the capping operation the caps travel through the chute at random but en train toward the bottom and are picked up by the jars. To re-state the prime purpose of my device, it is to keep the chute filled with embossed caps. In keeping the chute filled I allow for a small amount of operating length in the upper part of the chute for the functioning of the embossing device in which length or space there are actually no caps except those under the control of the embossing device.

The operating parts of my embossing device are supported upon a suitable frame F preferably mounted in any desired manner upon the frame of the capping machine 24, or optionally upon any suitable table or framework.

A motor 30 with conventional reduction gears provides power for two die wheels 31 and 32 through the medium of gears 33, 34, and 35. The gear 33 delivers power from the motor to the gear 34 which latter transmits the power to gear 35. The gears 34 and 35 are of the same pitch diameter as their respective die wheels and are associated therewith by common shafts 36 and 37 to which the gears and die wheels are keyed. It is desirable to provide a gear housing 38. The shafts 36 and 37 are rotatably supported in the frame in bearings 41.

The lower die wheel 31 is male and the upper die wheel 32 is female, the wheels containing the required embossing type 39 and 40 which is preferably replaceable according to standard practice. To accommodate these die wheels I provide a slot 23a in the chute 23.

The shaft 37 also carries cams 42 and 43 which may be integral with the shaft, or keyed thereto. The two cams are preferably integral to simplify timing. The die wheels and cams revolve once for each cycle of the machine, each cycle being effective to emboss one cap if such cap is fed to the embossing wheels.

Figure 6:
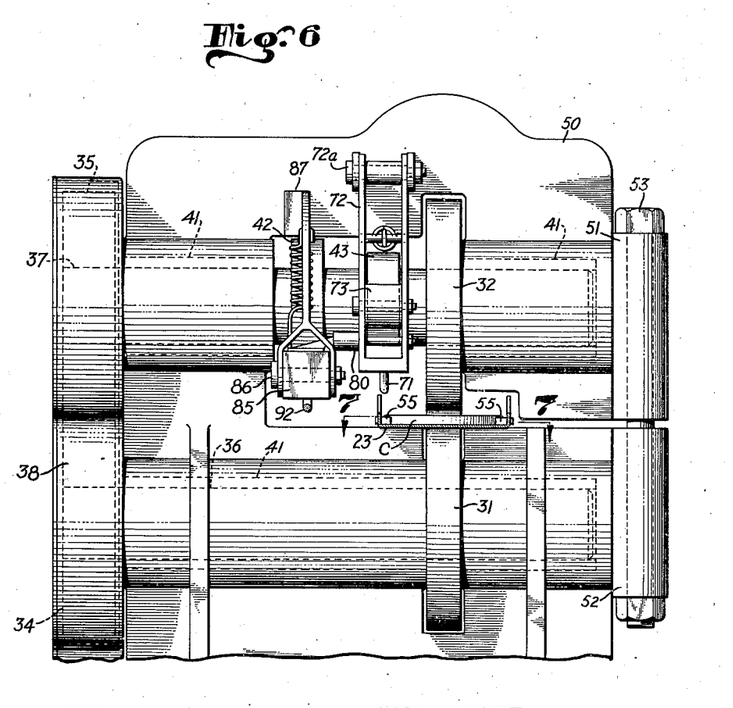
Figure 6 is a cross sectional view taken on the line 6—6 of Figure 5.

The frame F as seen particularly in Figure 6 includes a C shaped element 50 with separated sleeves 51 and 52 on the opposite open ends, through which sleeves an adjusting bolt 53 extends by which to adjust the spacing between the die wheels. The necessary adjustment required is very slight and the means shown have proved entirely satisfactory.

Figure 7:
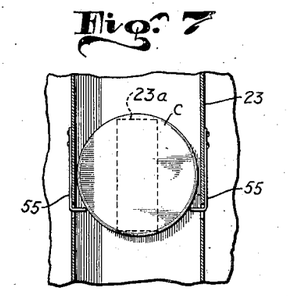
Figures 7 and 8 are fragmentary sectional views taken on the line 7—7 of Figure 6, illustrating particularly certain retaining springs in different operating conditions.
Figure 8:
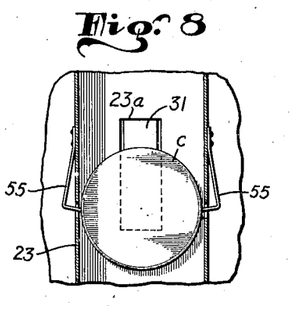

Assuming a cap has been released from the magazine for feeding to the embossing wheels, it slides down the chute and is caught by angle springs 55 (Figures 7 and 8). These springs catch and temporarily detain the cap (Figure 7) in the region of the die wheels whereby such wheels will grip the cap and pull it through the angle springs (Figure 8) while embossing the cap. After passing between the embossing wheels the cap will slide by gravity on down the chute and lodge against the uppermost of the caps remaining below in the chute. If no cap has been released and lodged against the angle springs the embossing or die wheels merely rotate without functional effect.

The control of the feed of caps from the magazine 22 to the capping machine chute 23 and consequently to the embossing device is by a cooperating mechanism adapted to make contact with caps at the upper and lower extremities of the embossing device. The upper cap contacting mechanism 60 is to stop or release a cap already in position for discharge from the magazine, and the lower cap contacting mechanism 61 involves a feel for the presence of a cap in the chute in what may be designated a control zone 61a.

Figure 1:
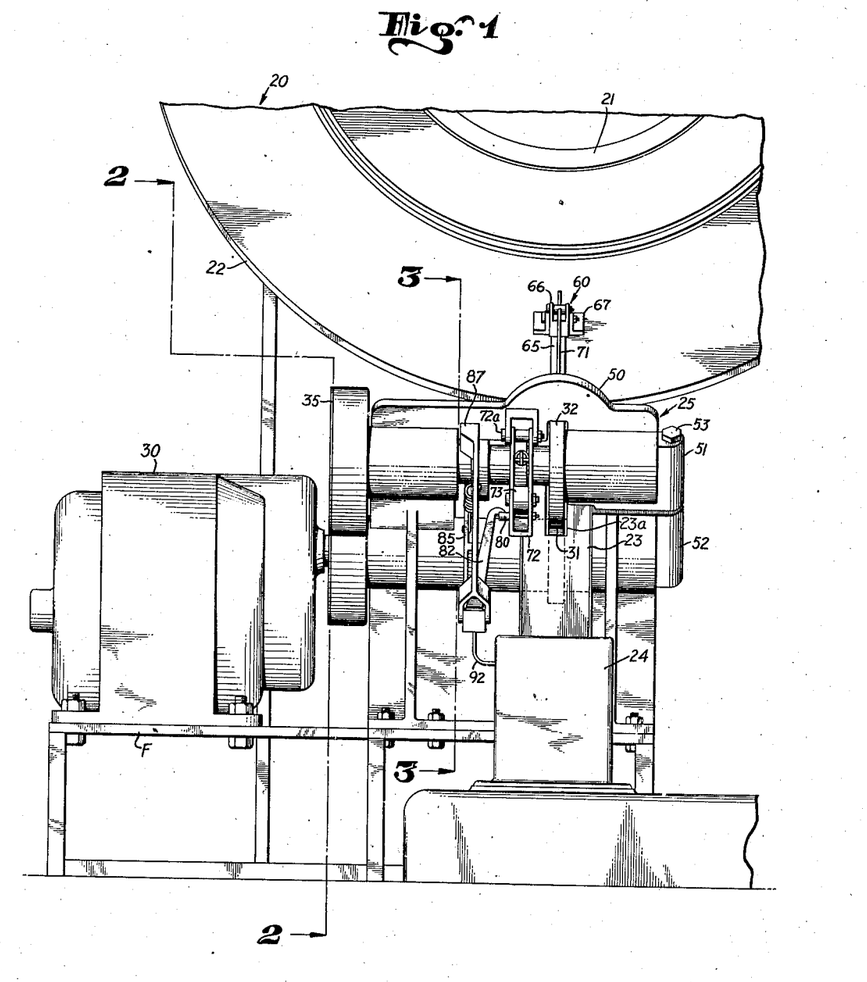
Figure 1 is a front elevational view of my embossing device shown in relation to fragments of a standard cap feeder and a standard capping machine.
Figure 2:
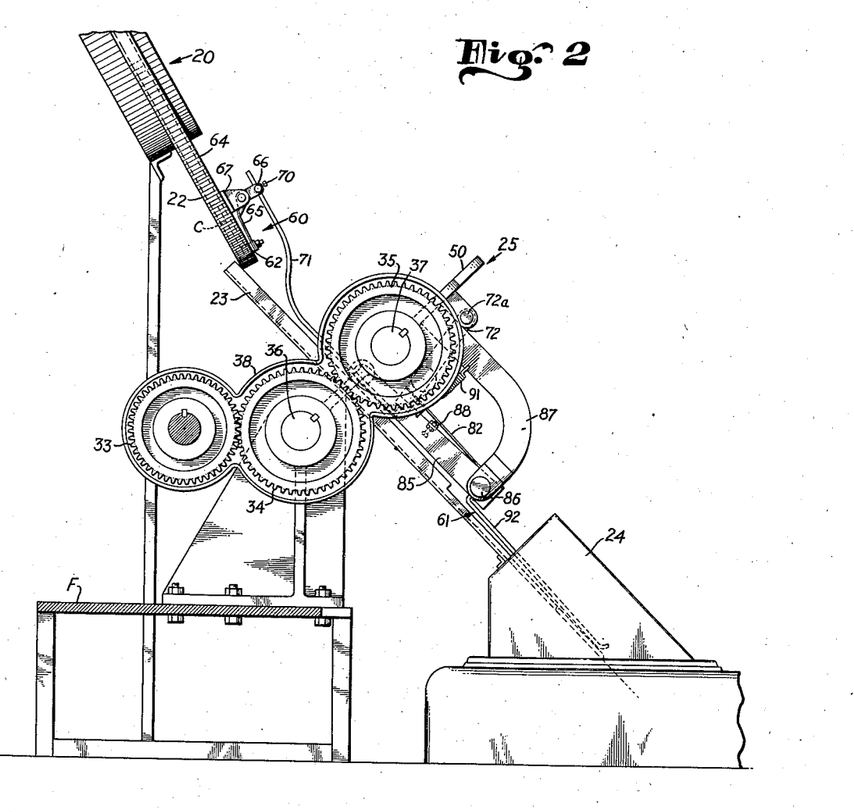
Figure 2 is a vertical sectional view taken on the line 2—2 of Figure 1.
Figure 3:
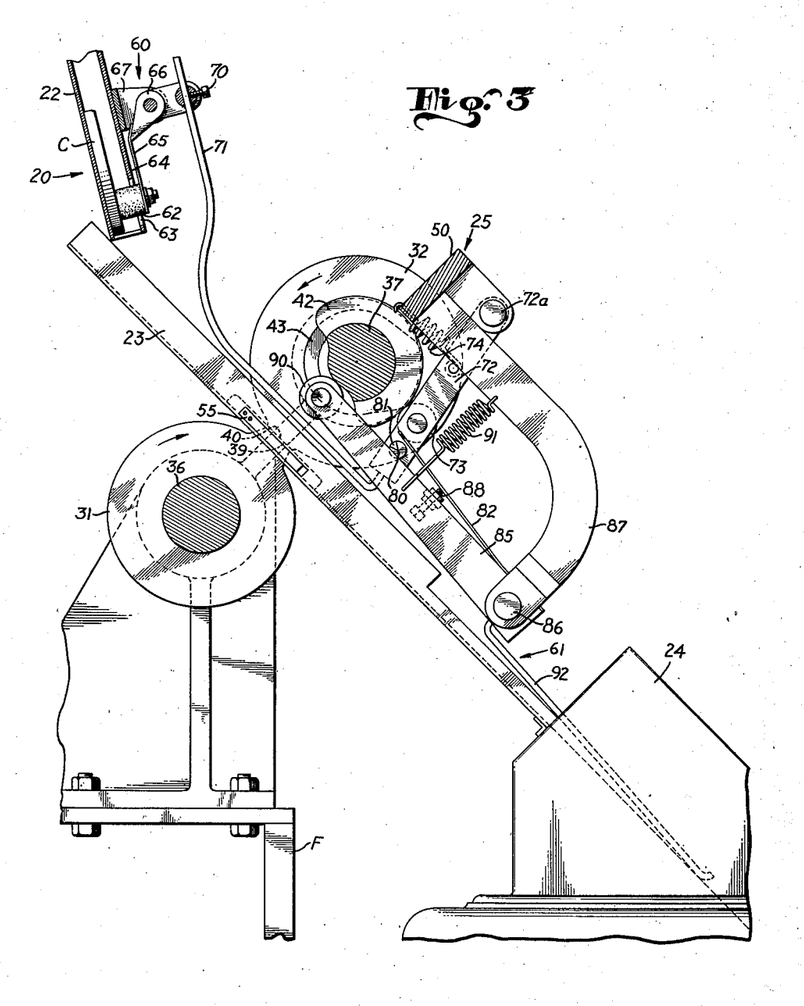
Figures 3, 4, and 5 are vertical sectional views all taken on the line 3—3 of Figure 1, illustrating different operating conditions of the embossing device as later described in detail.
Figure 4:
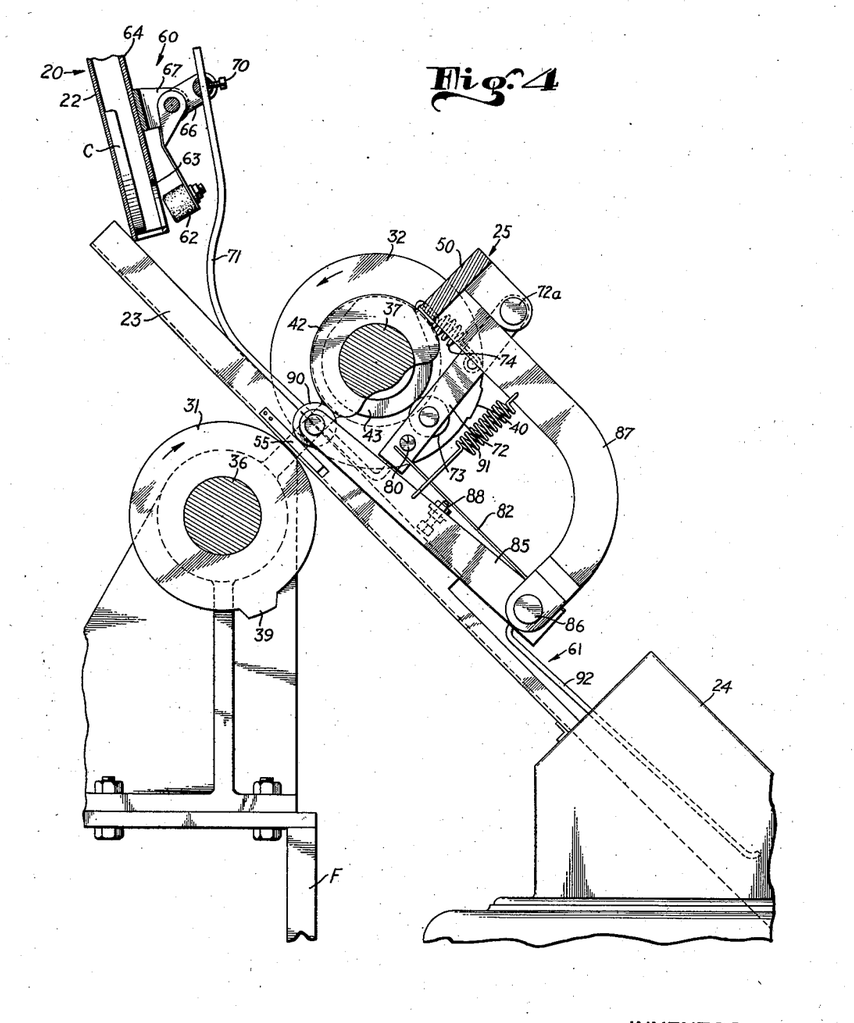

Referring to the upper mechanism 60, this includes a stop 62 working through a hole 63 in the top plate 64 of the magazine, this stop being carried at the end of a leaf spring 65, which in turn is mounted on a bell crank 66, the latter being rockably mounted on a bracket 67 which is welded or bolted upon the top plate 64 of the magazine. When the bell crank is rocked sufficiently anti-clockwise as viewed in Figure 3 and similar views, the stop 62 is lifted, as shown in Figure 4, and a cap is thus allowed to slide down. However, a very slight anti-clockwise rocking of the bell crank will not raise the stop 62 because a slight rocking will not take up the deformation of the spring 65. This is for a purpose which will later appear. The stop 62 is preferably made of rubber or other yielding, resilient material.

Figure 5:
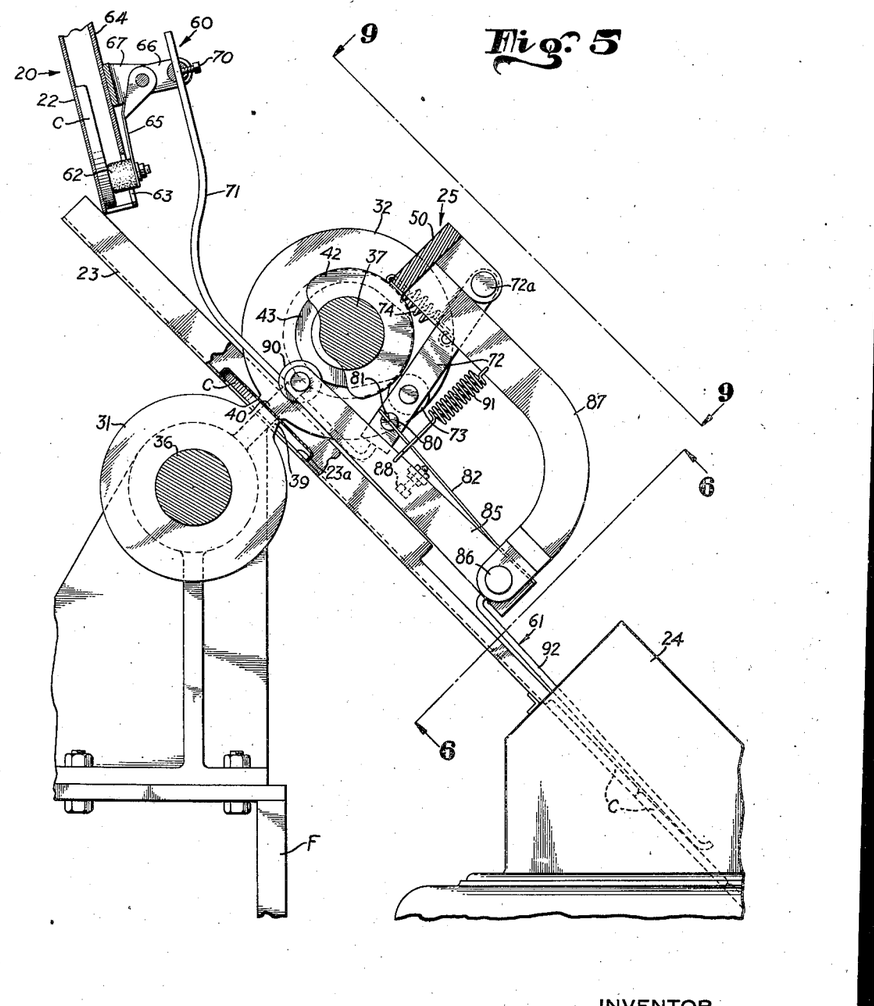

The bell crank 66 is rotatively and adjustably coupled as by a sleeve and set screw connection 70 to a link 71, which in turn is secured at its opposite end to a lever 72, which latter carries a roller 73, the roller being engageable by the cam 43. The roller 73 is pulled against the cam by a spring 74. When the crown of the cam 43 engages the roller 73 the link 71 and bell crank 66 are operated to keep the stop 62 in contact with the cap C (Figures 3 and 5). After the crown of the cam passes (Figure 4) the spring 74 pulls the lever 72 in so that the roller 73 follows the reduced diameter of the cam, and this will cause the bell crank to rock anti-clockwise and lift the stop 62 from the cap, permitting the cap to slide down.

The operation last described assumes that there is no cap in the control position below the mechanism 61. If there is a cap in the control position below mechanism 26 the anti-clockwise rocking of the bell crank to release a cap is inhibited by mechanism next to be described.

Figure 9:
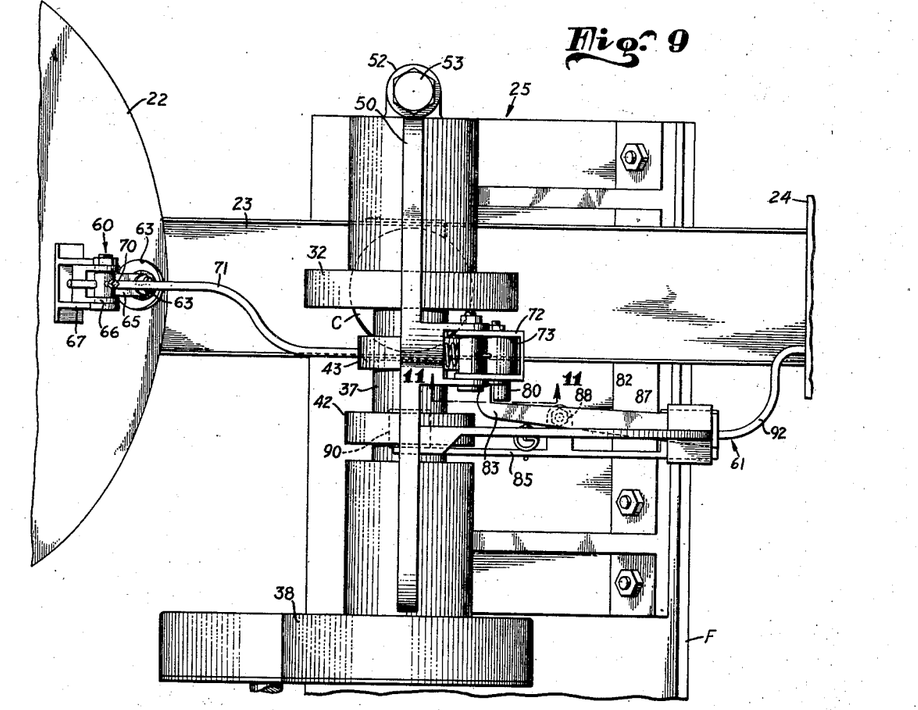
Figure 9 is a top plan view as seen along line 9—9 of Figure 5.
Figure 10:
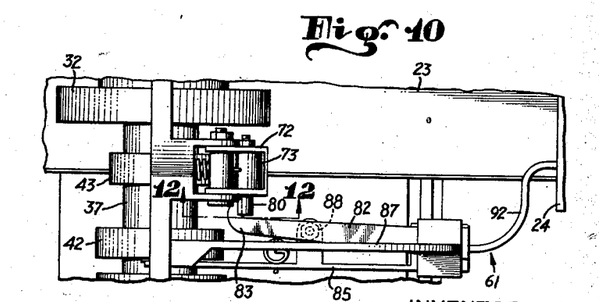
Figure 10 is a fragmentary top plan view in a position similar to that of Figure 9 showing a part of the mechanism in different operating condition.
Figure 11:
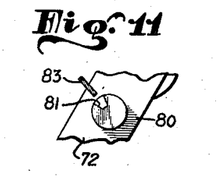
Figure 11 is a fragmentary sectional view taken on the line 11—11 of Figure 9.
Figure 12:
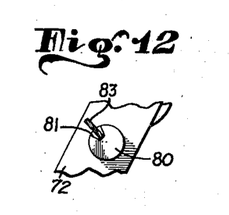
Figure 12 is a fragmentary sectional view taken on the line 12—12 of Figure 10, these two fragmentary sectional views being of the same parts at the same location but in different operating conditions.

On the lever 72 already referred to is a pin 80 formed with a V notch or groove 81 as may be seen particularly in Figures 11 and 12. To functionally cooperate with this pin is a leaf spring 82 having a hook end 83 as illustrated in Figures 9 and 10 which end is adapted to engage in the V notch 81 of the pin 80 if positioned for such engagement. This hook end of the spring 82, however, may be positioned above or below the pin 80 whereby the spring will not engage in the notch of the pin and consequently will have no effect thereon. If the spring 82 is engaged in the notch of the pin 80 the lever 72 is held against its normal movement on pivot 72a by the spring 74 and consequently the bell crank 66 is not permitted to rock anti-clockwise and therefore will not function to release a cap. There is actually a minute movement of the lever 72 in the engagement and disengagement of the spring 82 in the notch of the pin 80, which movement has no effect on the stop 62 because it does not take up the tension of the leaf spring 65.

The spring 82 is mounted upon an arm 85 pivoted at 86 on a part 87 of the frame F, this spring being adjustable by a set screw arrangement 88. At the upper end of the arm 85 is a roller 90 adapted for engagement with the cam 42. A spring 91 pulls the roller 90 against the cam 42. Extending from the lower end of the arm 85 is a feeling finger 92 which is the element that makes direct feeling contact with a cap as shown in Figure 5. The feeling finger 92 has three major operating positions: (1) at the bottom of the chute, as in Figure 3, there being no cap present; (2) in its uppermost position under influence of the cam, as shown in Figure 4; (3) its intermediate position as determined by the thickness of the cap, as illustrated in Figure 5. When the feeling finger 92 is in either of its extreme positions the spring 82 is clear of the pin 80 and the lever 72 is therefore free to swing under influence of the spring 74. Only in its intermediate position when feeling a cap, does the spring 82 engage the notch 81 of the pin 80.

By the cooperating action of the cam 42 and spring 91 the finger 92 is caused to perform a cycle with each revolution of the gears and die wheels. The finger is first raised to the position of Figure 4 by action of the cam. When the minimum diameter of the cam is reached, the spring 91 tends to force the finger 92 to the bottom of the chute, which will occur as shown in Figure 3, if no cap is present in the control position, which is in the region of the lower end of the finger 92. This results, as previously explained, in a cap being released by stop 62. If, on its way down, the finger 92 meets a cap in the control position (Figure 5) it is prevented by the cap from reaching the bottom of the chute, and positions the spring 82 diametrically of the pin 80 which results in the function previously described of inhibiting normal release movement of the lever 72 and the stop 62.

Sectional operation of the several sub-assemblies has been described. I will now trace one complete operating cycle under opposite conditions.

Assuming that caps are available for discharge in the correct position from the feeder, and that the control zone in the chute 23 is empty: The finger 92 rests in the bottom of the chute, the arm 85 is thereby positioned so that the hook end 83 of the spring 82 is above the notched pin 80, cam 43 has passed its peak, permitting lever 72 to swing clockwise on its pivot 72a, transmitting movement through rod 71 to the rocker arm 66 of sufficient magnitude to absorb the tension of the spring 65 and raise the stopper 62, permitting the cap C to drop from the magazine 22 into the chute 23. The cap slides down the chute and comes to rest between the angle springs 55. At the same time, the die wheels have rotated to bring the type into registry at the embossing station which is in the region of the angle springs. If the device is just starting up, the first revolution of the die wheels will be idle. On the next revolution, the die wheels will perform the embossing operation on the cap, simultaneously seizing the cap and pulling it through the springs. The cap is thereupon released and slides on down the chute. If the lower end of the chute is empty, the cap will pass below the finger 92 when this finger is elevated by the crown of the cam 42 acting on the roller 90. The device is timed so that this elevation of the finger commences after the embossing operation is completed.

Assuming that caps entrained in the lower end of the chute result in one or more occupying the control zone, and that the finger 92 has been elevated by the action of cam 42 on the roller 90: When the peak of the cam 42 passes, the finger starts to descend under influence of the spring 91, but halfway down, the finger feels the cap and stops. This positions the hook end 83 of the spring 85 for engagement in the V notch 81 of the pin 80, so that when the peak of cam 42 passes roller 73, and the lever 72 starts to swing under influence of the spring 74, its movement is intercepted by the interengagement of pin and spring, and the stopper 62 will not be elevated. Hence no cap is freed for delivery from the magazine, and the embossing wheels rotate idly, a condition which will be repeated each cycle so long as the chute control zone remains filled. There is always room for the cap last embossed to drop away from the wheels, so that no cap is ever impaired or mutilated by repeated action of the die wheels.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A device of the character described comprising: a gravity chute, means to emboss a cap in said chute, means to detect the presence of a predetermined number of caps in said chute, and means responsive to said detecting means to deliver a cap into said chute in position for embossing only when such predetermined number of caps is not present in said chute.

2. A cap embossing device comprising: a slotted cap gravity chute, die wheels mutually cooperating through the slot of said chute in due transverse direction to emboss a cap, means to deliver caps into said chute, and means operable in another transverse direction to yieldably arrest the caps in position in the chute to be acted on by the die wheels.

3. A cap embossing device comprising: a gravity chute, means to emboss a cap in said chute, and means to deliver a cap into said chute only under given conditions, said means comprising a magazine adapted to position one cap at a time above and adjacent to said chute, a stopper on said magazine adapted to engage a cap so positioned and restrain same from delivery, and means to disengage said stopper from said cap, said last named means comprising a cam rotatable in synchronism with the embossing means, mechanical connections between the cam and the stopper whereby the stopper is held in cap engagement by the crown of the cam, and a spring shifting said connections to disengage said stopper when the crown of the cam has passed.

4. A cap embossing device comprising: a slotted gravity cap chute, die wheels cooperating through the slot of the chute to emboss a cap, a cap feeder magazine having a cap delivery opening above and aligned with said chute, a rockably mounted stopper at said delivery opening adapted to engage and restrain or disengage from and release a cap there positioned, a cam synchronized with the die wheels, means operatively associating the cam and the rockable stopper mounting whereby the crown of the cam holds the stopper in engagement with the cap, and a spring opposing the cam and connected with said means whereby the stopper is rocked to disengaging position when the crown of the cam is not acting.

5. A cap embossing device comprising: a slotted gravity cap chute, die wheels cooperating through the slot of the chute to emboss a cap, a cap feeder magazine having a cap delivery opening above and aligned with said chute, a rockably mounted stopper at said delivery opening adapted to engage and restrain or disengage from and release a cap there positioned, a cam synchronized with the die wheels, means operatively associating the cam and the rockable stopper mounting whereby the crown of the cam holds the stopper in engagement with the cap, a spring opposing the cam and connected with said means whereby the stopper is rocked to disengaging position when the crown of the cam is not acting, and means rendering said spring ineffective to rock said stopper when there is a predetermined accumulation of caps in the chute below the die wheels.

6. A cap embossing device comprising: a slotted gravity cap chute, die wheels cooperating through the slot of the chute to emboss a cap, a cap feeder magazine having a cap delivery opening above and aligned with said chute, a rockably mounted stopper at said delivery opening adapted to engage and restrain or disengage from and release a cap there positioned, a cam synchronized with the die wheels, means operatively associating the cam and the rockable stopper mounting whereby the crown of the cam holds the stopper in engagement with the cap, a spring opposing the cam and connected with said means whereby the stopper is rocked to disengaging position when the crown of the cam is not acting, and means rendering said spring ineffective to rock said stopper when there is a predetermined accumulation of caps in the chute below the die wheels, said last named means comprising a restraining member adapted to engage the means which associate the cam and the stopper mounting, a feeling finger associated with the restraining member and having a portion adapted to rise and fall in a control zone of the chute and to rest upon a cap in such control zone if a cap is there present, said finger positioning said restraining member in engaging position when said finger is resting upon a cap and in disengaged position if no cap is present in the control zone.

7. A cap embossing device comprising: a slotted gravity cap chute, die wheels cooperating through the slot of the chute to emboss a cap, a cap feeder magazine having a cap delivery opening above and aligned with said chute, a rockably mounted stopper at said delivery opening adapted to engage and restrain or disengage from and release a cap there positioned, a cam synchronized with the die wheels, means operatively associating the cam and the rockable stopper mounting whereby the crown of the cam holds the stopper in engagement with the cap, a spring opposing the cam and connected with said means whereby the stopper is rocked to disengaging position when the crown of the cam is not acting, and means rendering said spring ineffective to rock said stopper when there is a predetermined accumulation of caps in the chute below the die wheels, said last named means comprising a restraining member adapted to engage the means which associate the cam and the stopper mounting, a feeling finger associated with the restraining member and having a portion adapted to rise and fall in a control zone of the chute and to rest upon a cap in such control zone if a cap is there present, said finger positioning said restraining member in engaging position when said finger is resting upon a cap and in disengaged position if no cap is present in the control zone, a cam actuating said finger to rise, and a spring opposing the cam and causing said finger to fall into feeling position when the crown of the cam is not acting.

8. In a device of the character described, the combination of: a cap chute, cap embossing means associated with the chute, a cap feeding zone in the chute above the embossing means, a cap control zone in the chute below the embossing means, cap feeding means above said feeding zone, and cap retaining springs on said chute adjacent said embossing means acting in a direction transverse to the embossing means to temporarily retain caps in position for embossing.

9. In a device of the character described, the combination of: a cap chute, cap embossing means associated with the chute, a cap feeding zone in the chute above the embossing means, a cap control zone in the chute below the embossing means, cap feeding means above said feeding zone, releasable stop means associated with the cap feeding means to detain or release a cap positioned for delivery to the chute feeding zone, and a control for said stop means including a cap feeling finger in the control zone and mechanism operatively associating the feeling finger and the stop means operable to position the stop means in cap detaining position when said finger encounters a cap in the control zone and in cap releasing position when no cap is present in the control zone.

10. In a device of the character described, the combination of: an inclined cap chute, cap embossing zone associated with said chute, cap feeding means associated with said chute above said embossing zone to deliver caps down said chute to said embossing zone, said chute embodying a control zone below said embossing zone, and means operatively interrelating said feeding means and said control zone to detect the presence or absence of a cap in said control zone and permit a cap to descend from said feeding means into said chute only when there is absence of a cap in said control zone.

11. In a device of the character described, the combination of: an inclined cap chute, cap embossing zone associated with said chute, cap feeding means associated with said chute above said embossing zone to deliver caps down said chute to said embossing zone, said chute embodying a control zone below said embossing zone, and means operatively interrelating said feeding means and said control zone to detect the presence or absence of a cap in said control zone and permit a cap to descend from said feeding means into said chute only when there is absence of a cap in said control zone, said last named means including a member vertically reciprocable in said control zone to feel for a cap and responsive by its position when engaging a cap to transmit control to said feeding means inhibiting the feeding action thereof.

12. A cap delivery mechanism comprising a magazine having a gravity outlet, a downwardly directed chute from said outlet and an intermittently acting cap retaining and releasing stopper mechanism associated with said outlet, an embossing zone in said chute and a control zone therein below said embossing zone, a first means in said embossing zone having positions temporarily arresting free falling progress of a cap and progressively advancing said cap therethrough, a second means in said control zone adapted to engage a cap therein, said stopper mechanism comprising a linkage extending into the embossing zone, cam means jointly associated with said first means and said linkage having a cap releasing relationship with the linkage when said first means has completed an advance of a cap and a cap retaining relationship with the linkage when said first means is in a temporary arresting position, said second means being adapted to occupy a linkage engaging position wherein the stopper mechanism is detained in cap retaining relationship when a cap in the control zone engages with said second means and a linkage releasing relationship when no cap lies in the control zone wherein the stopper mechanism is in cap releasing relationship.

13. A cap delivery mechanism comprising a magazine having a gravity outlet, a downwardly directed chute from said outlet and an intermittently acting cap retaining and releasing stopper mechanism associated with said outlet, an embossing zone in said chute and a control zone below said embossing zone, a first means in said embossing zone operable to temporarily arrest progress of a cap and to progressively advance said cap therethrough, said first means comprising opposed contact elements synchronized to simultaneously engage and move the cap through the embossing zone, a second means in said control zone adapted to engage a cap therein, said stopper mechanism comprising a linkage extending into the embossing zone, said second means comprising a finger pivotally mounted in the chute having one end extending into the embossing zone and having alternate engaging and releasing positions with the linkage, cam means jointly associated with said first means and said linkage having a cap releasing relationship with the linkage when said first means has completed an advance of a cap and a cap retaining relationship with the linkage when said first means is in a temporary arresting position, said one end of the finger being adapted to occupy a linkage engaging position wherein the stopper mechanism is retained in cap retaining relationship when a cap in the control zone engages the finger and a linkage releasing relationship when no cap lies in the control zone wherein the stopper mechanism is in cap releasing relationship.

14. A cap embossing and delivery mechanism comprising an inclined gravity chute, resilient temporary detent means in the chute having normally a cap arresting relationship, and a cap embossing means comprising opposed die wheels including complementary type elements thereon having progressively advancing contiguous positions during a portion of a period of rotation of said wheels, said type elements being in cap embossing engagement when in said contiguous positions and adapted to advance said cap simultaneously with the embossing thereof to a position released from said detent means.

WILLIAM HERBERT KAGLEY.

REFERENCES CITED

The following references are of record in the file of this patent:

UNITED STATES PATENTS

| Number | Name | Date |
|---|---|---|
| 559,216 | Richards | Apr. 28, 1896 |
| 818,893 | Jung | Apr. 24, 1906 |
| 909,396 | Gilmore et al. | Jan. 12, 1909 |
| 1,059,311 | Nygaard | Apr. 15, 1913 |
| 1,657,382 | Felten | Jan. 24, 1928 |
| 1,694,955 | Van Veen | Dec. 11, 1928 |
| 2,053,763 | Brinton | Sept. 8, 1936 |
| 2,076,116 | Brinton | Apr. 6, 1937 |
| 2,082,048 | Everett | June 1, 1937 |
| 2,195,173 | Jackson | Mar. 26, 1940 |
| 2,246,582 | Gantzer | June 24, 1941 |
| 2,380,194 | Sharp | July 10, 1945 |